United States Patent
Schlosser et al.

(10) Patent No.: US 7,135,795 B2
(45) Date of Patent: Nov. 14, 2006

(54) INSERT MOLDED END BELL FOR A SUBMERSIBLE MOTOR AND METHOD OF MANUFACTURE THEREOF

(75) Inventors: Kraig Schlosser, Columbo City, IN (US); Hugh R. Harris, Marion, IN (US)

(73) Assignee: Franklin Electric Co., Inc., Bluffton, IN (US)

( * ) Notice: Subject to any disclaimer, the term of this patent is extended or adjusted under 35 U.S.C. 154(b) by 0 days.

(21) Appl. No.: 10/979,312

(22) Filed: Nov. 2, 2004

(65) Prior Publication Data

US 2005/0116562 A1 Jun. 2, 2005

Related U.S. Application Data

(60) Provisional application No. 60/526,382, filed on Dec. 2, 2003.

(51) Int. Cl.
*H02K 5/10* (2006.01)
*H02K 5/12* (2006.01)
*H02K 1/04* (2006.01)
*H02K 7/08* (2006.01)

(52) U.S. Cl. .............................. 310/87; 310/85; 310/43
(58) Field of Classification Search ................. 310/89, 310/90–91, 43, 64, 85, 87, 88
See application file for complete search history.

(56) References Cited

U.S. PATENT DOCUMENTS

| | | | | |
|---|---|---|---|---|
| 3,444,402 A | * | 5/1969 | Cartier | 310/43 |
| 4,315,343 A | * | 2/1982 | Neroda et al. | 15/339 |
| 4,325,012 A | * | 4/1982 | Schaefer | 318/786 |
| 4,336,473 A | * | 6/1982 | Wetters et al. | 310/88 |
| 4,553,442 A | * | 11/1985 | Mazzorana | 74/7 A |
| 4,673,836 A | * | 6/1987 | Akiyama et al. | 310/239 |
| 4,847,528 A | * | 7/1989 | Eguchi et al. | 310/239 |
| 4,899,432 A | * | 2/1990 | Adam et al. | 29/596 |
| 4,918,324 A | * | 4/1990 | Isozumi | 290/48 |
| 5,051,636 A | * | 9/1991 | Ishimoto et al. | 310/90 |
| 5,945,746 A | * | 8/1999 | Tracewell et al. | 307/43 |

(Continued)

FOREIGN PATENT DOCUMENTS

EP 0 778 650 6/1997

(Continued)

OTHER PUBLICATIONS

International Search Report for PCT/US2004/039957, dated Mar. 23, 2005.

(Continued)

*Primary Examiner*—Tran Nguyen
*Assistant Examiner*—Erik Preston
(74) *Attorney, Agent, or Firm*—Marshall, Gerstein & Borun LLP

(57) ABSTRACT

An end bell for a motor has a base plate, a bearing and a molded insert to couple the bearing to the base plate. The end bell with molded insert is durable, light weight and has good anti-corrosion properties. The bearing is held in relation to the base plate while the molded insert is disposed. A post-mold machining operation can be used to both size the bearing hole to the motor shaft but also to align the hole in relation to the base plate. Bushings and fasteners for assembly of the end bell to the motor housing and supplemental supports may be pre-attached to the base plate, molded into the molded insert or added in a post-mold operation. Deformations in the end bell may be used to couple the molded insert to the end bell.

16 Claims, 8 Drawing Sheets

U.S. PATENT DOCUMENTS

| | | | |
|---|---|---|---|
| 5,961,222 A * | 10/1999 | Yabe et al. | 384/476 |
| 6,058,594 A * | 5/2000 | Neumann et al. | 29/596 |
| 6,294,850 B1 * | 9/2001 | Yui et al. | 310/40 MM |
| 6,489,702 B1 * | 12/2002 | Bartman | 310/219 |
| 6,849,974 B1 * | 2/2005 | Howe et al. | 310/89 |
| 6,946,765 B1 * | 9/2005 | Rapp et al. | 310/90 |
| 2001/0017495 A1 | 8/2001 | Sato et al. | |
| 2003/0086630 A1 * | 5/2003 | Bramel et al. | 384/476 |

FOREIGN PATENT DOCUMENTS

| | | |
|---|---|---|
| FR | 1.217.229 * | 12/1958 |
| GB | 1 347 767 | 2/1974 |
| JP | 03207233 | 9/1991 |
| JP | 2004-23937 | 1/2004 |

OTHER PUBLICATIONS

Reference 1, a drawing of a conventional submersible motor having a cast iron end bell including a stainless steel cover.

Reference 2, a drawing of a conventional submersible motor having a plastic end bell.

* cited by examiner

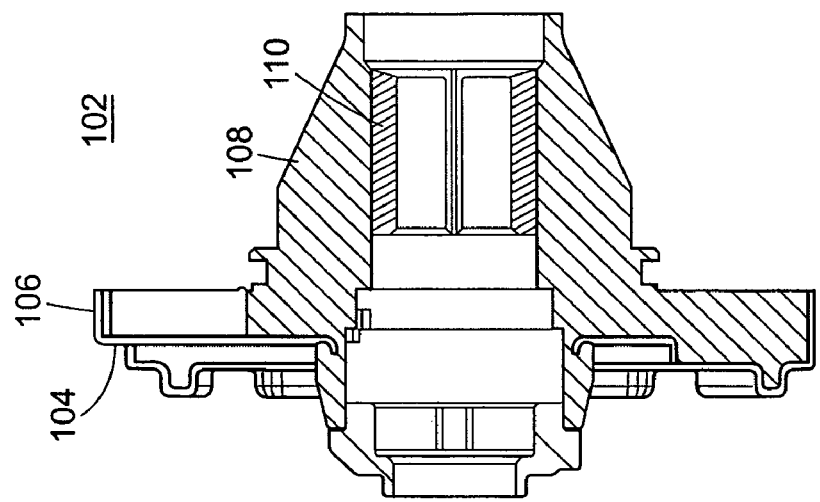
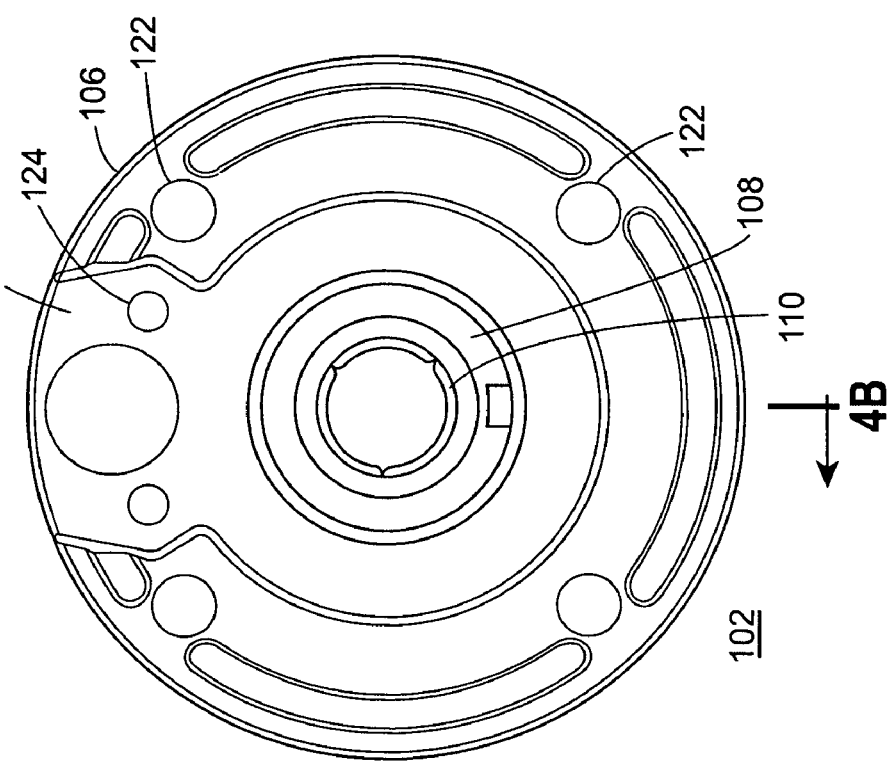

INSERT MOLDED END BELL FOR A SUBMERSIBLE MOTOR AND METHOD OF MANUFACTURE THEREOF

This application claims the benefit of U.S. Provisional Patent Application No. 60/526,382, filed Dec. 2, 2003, under 35 U.S.C. 119(e).

TECHNICAL FIELD

This invention relates in general to motors and more specifically to an insert molded end bell for motors, such as submersible motors, and method of manufacture thereof.

BACKGROUND

Submersible motors are known. The motors typically have a housing, and end bell and bearing assemblies. The integrity of the housing, end bells and bearing assemblies is crucial to the life of such motors. Imperfections, damage due to impacts, and housing corrosion that allow moisture to penetrate the housing can dramatically shorten the life of the motor. Many submersible motor applications are in remote or other difficult to service environments where the cost of replacement may be more than the motor itself, placing a premium on quality and durability.

Stamped end bells require multiple components and expensive assembly operations. Cast end bells require expensive secondary machining operations to achieve the tolerances required. Each such secondary operation is another point where a defect in the integrity of the motor may be introduced. All-metal construction increases the opportunity for corrosion. High quality stainless steel reduces the risk of failure due to corrosion but is expensive and adds weight to the motor. All-plastic end bells have good corrosion characteristics but often lack structural integrity of their metal counterparts and may also require expensive post-molding manufacturing steps to place and secure bearings.

SUMMARY

An end bell for a motor has a metal base plate, a molded insert and a bearing. The operation forming the molded insert couples the bearing to the end bell. Structural elements of the end bell as well as the coupling of the bearing are formed in the molding operation. A secondary machining operation can correct for placement variations when molding the bearing. Features on the base plate, for example, a burr, can be used to retain the molded insert. The molded insert can provide improved corrosion characteristics over prior art end bells without molded inserts. The base plate and the bearing may be inserted into a mold and the molded insert formed using the base plate and bearing as mold elements.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 4A–4C shows top, bottom and sectional views of the insert molded end bell of FIG. 1.

DETAILED DESCRIPTION

Figure 1:
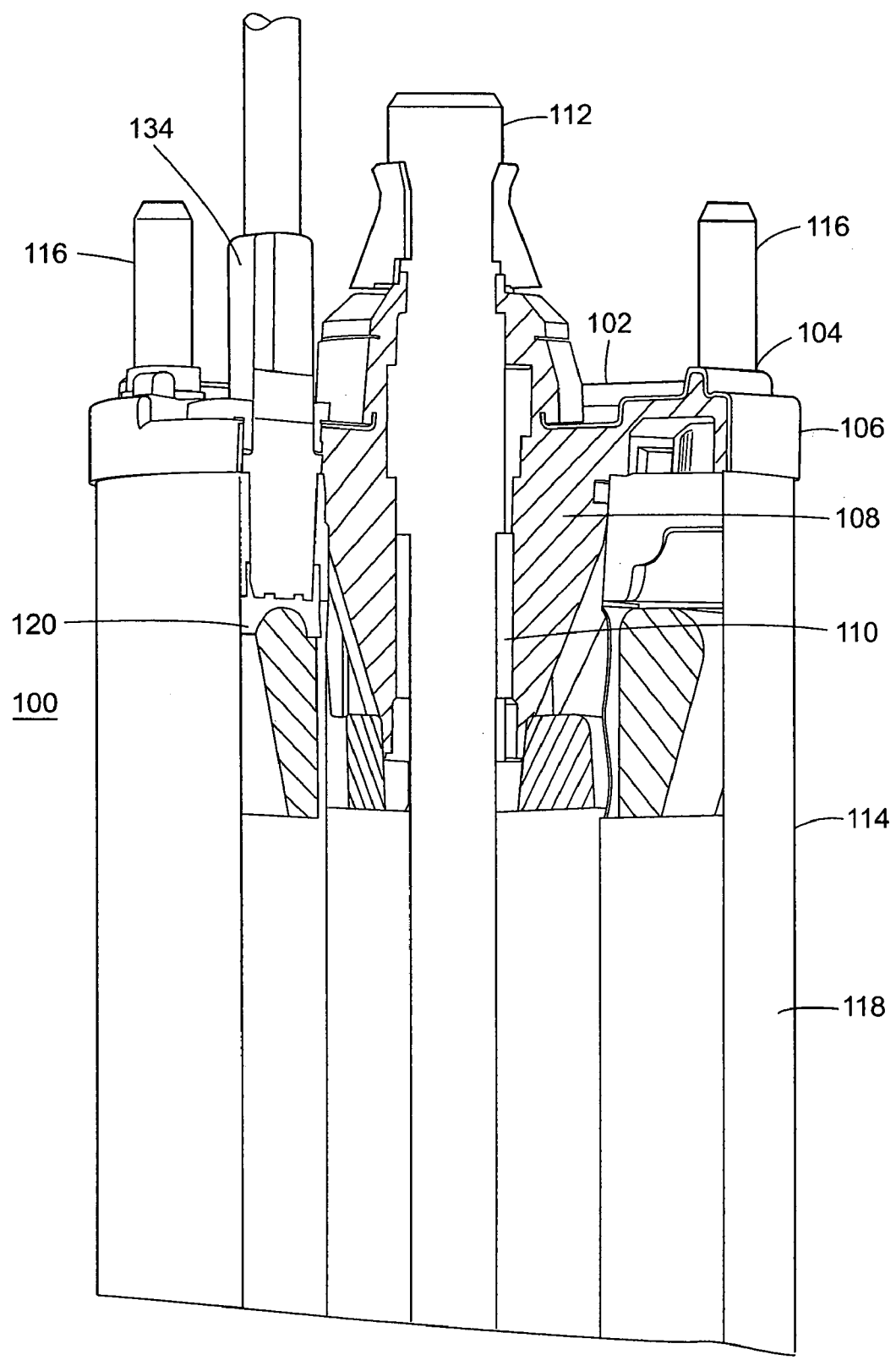
FIG. 1 is a sectional view of a motor having an insert molded end bell.

A motor 100 having an insert molded end bell 102 is illustrated in FIG. 1. The motor 100 described is a submersible motor, but the present invention is applicable to other motors, as well. The end bell 102 has a base plate 104 with a rim 106. The end bell 102 also has a molded insert 108 coupling a bearing 110 to the base plate 104. A motor shaft 112 protrudes through the end bell 102. The end bell 102 is held to a housing 114 with fasteners, such as mounting screws 116. The motor 100 also comprises a conventional motor apparatus 118. Electrical connections to the motor apparatus 118 are made through an electrical connector 120.

Figure 2:
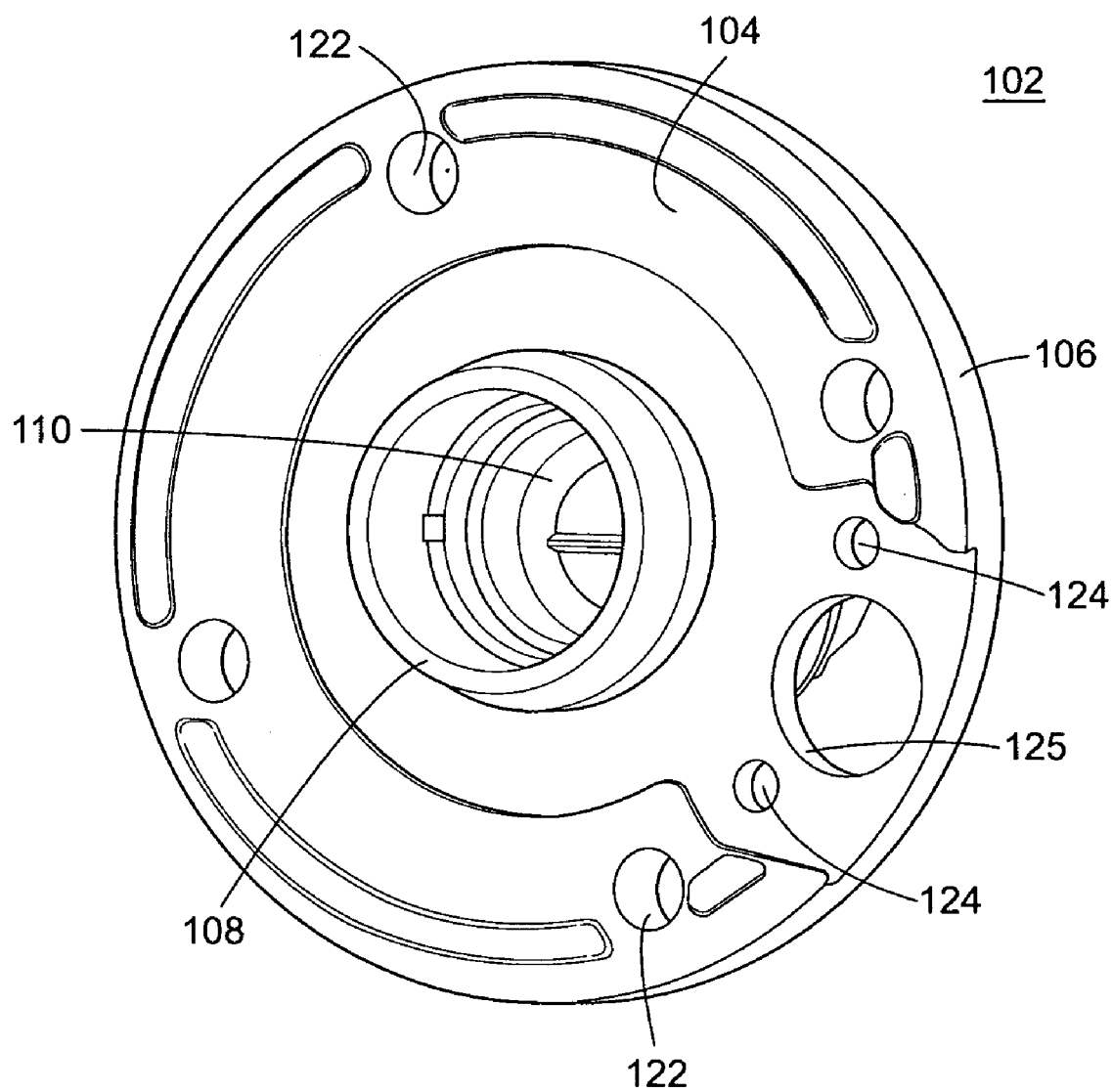
FIG. 2 is a perspective view of the top of the insert molded end bell of FIG. 1.
Figure 3:
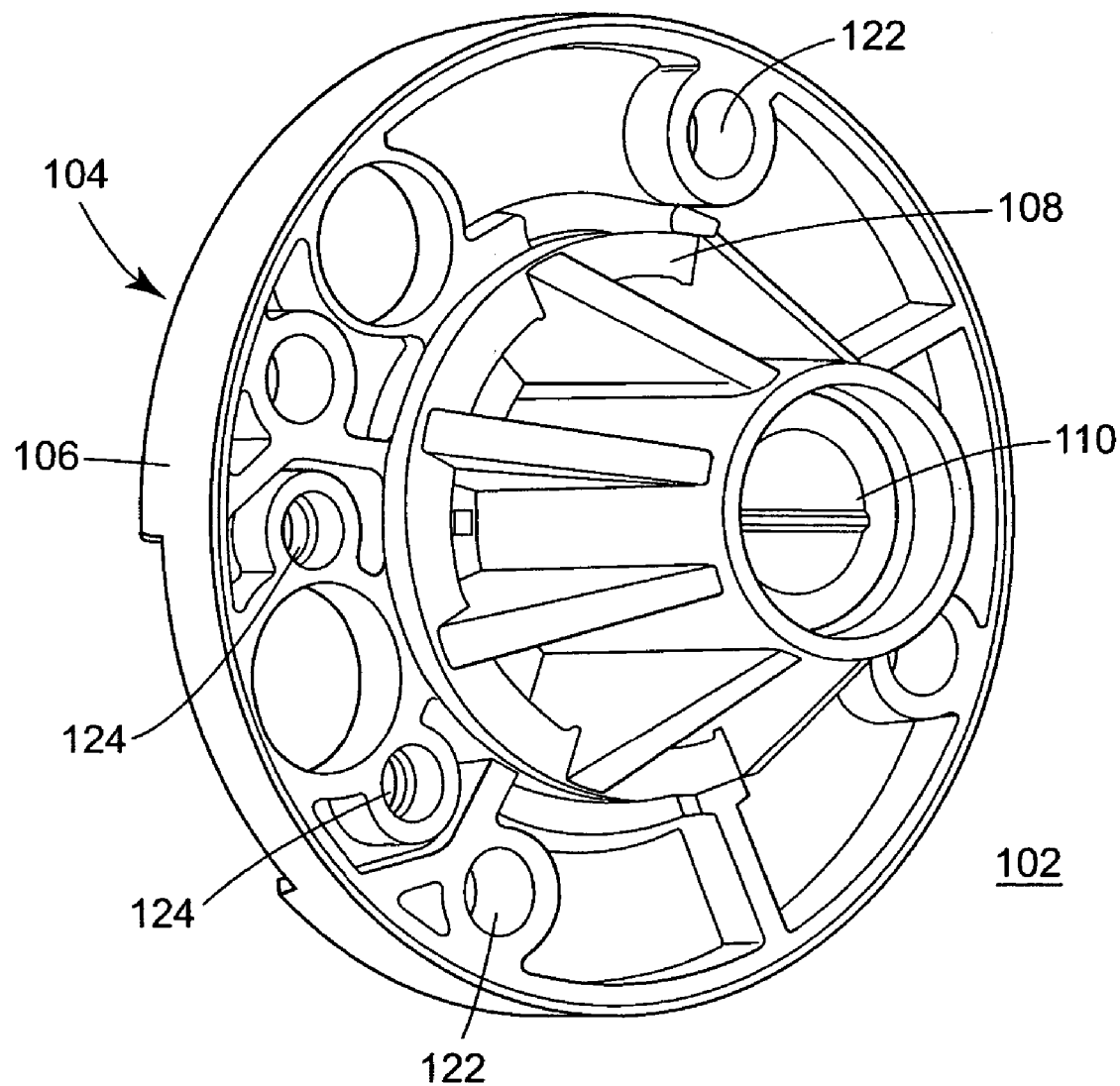
FIG. 3 is a perspective view of the bottom of the insert molded end bell of FIG. 1.
Figure 4C:
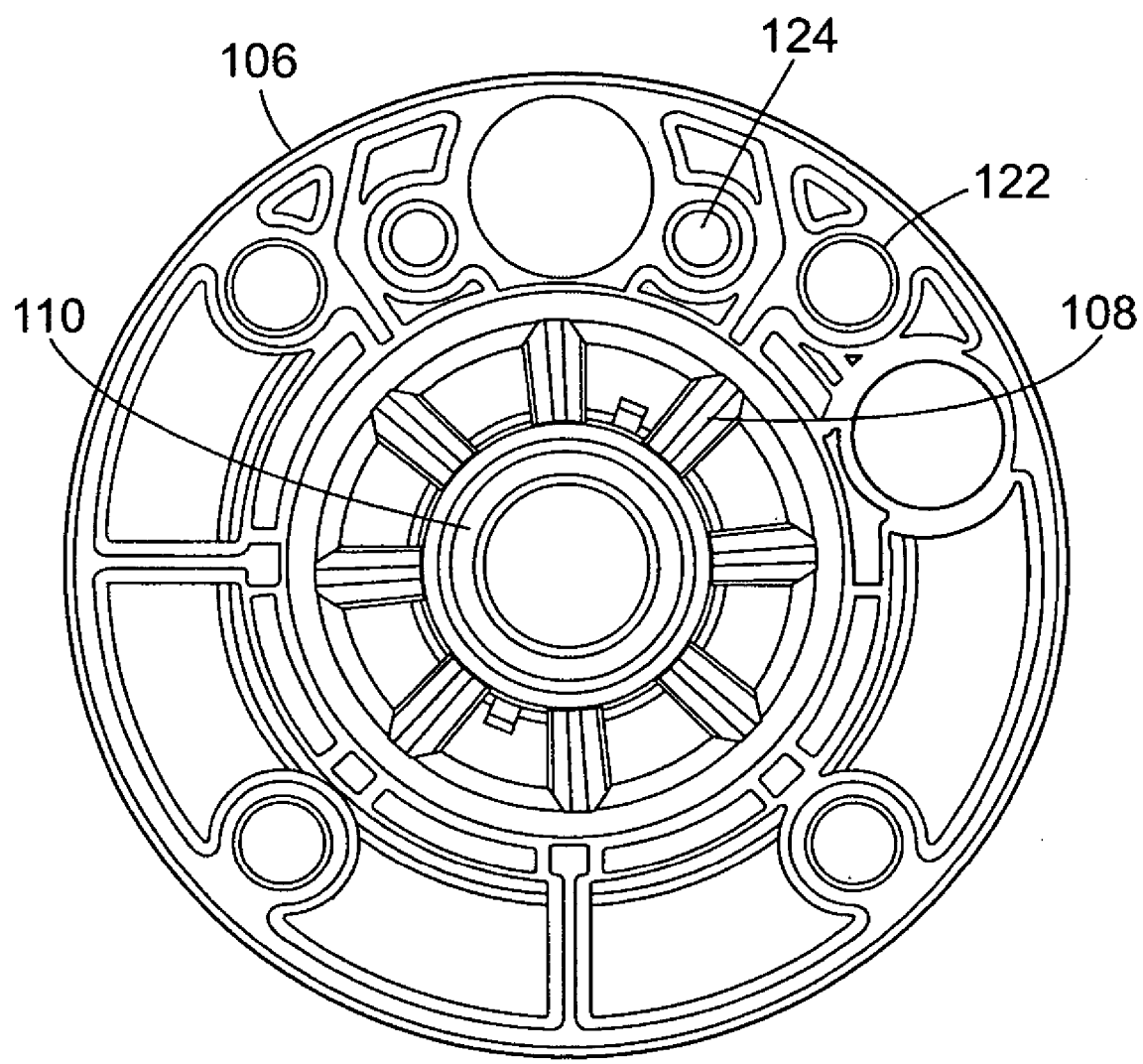

More specifically and referring to FIGS. 1–3, the base plate 104 has a plurality of mounting holes 122. The base plate 104 and the housing 114 may be metal, particularly stainless steel. The base plate 104 may be formed in any of several ways, but stamping is used in one embodiment. The rim 106 is substantially normal to the plane of the base plate 104.

The bearing 110 is preferably a conventional hydrodynamic bushing-type bearing, often used in vertically mounted motors, but may also be a ball-bearing, needle bearing or other known bearing. The molded insert 108 couples the bearing 110 to the base plate 104. In forming the end bell 102, the base plate 104 and the bearing 110 are aligned and held in place in a molding apparatus (not shown).

The molding compound is injected to substantially fill in the shape of the end bell 102, and in the process fully or partially encapsulates the outer surface of the bearing 110. The molded insert 108 may include other features such as mounting cavities, splines, alignment guides, mounting holes 122, 124 and the like. The bearing 110 may be fabricated to have a slightly smaller inner diameter than desired for the final application. The bearing 110 may then be machined to the correct diameter for accepting the motor shaft 112. Additionally, while machining the bearing 110 to the correct size, variations of the final placement of the bearing that occur in the molding process can be corrected by machining the inner diameter of the bearing to have a predetermined spatial relationship with the motor apparatus 118 and its shaft 112. This may be accomplished by machining the bearing 110 in relationship to a feature of merit, for example, a base plate rim 106, a base plate surface 138, a mounting hole 122, or a molded insert surface 140.

The mounting screws 116 that connect through the mounting holes 122 in the end bell 102 to the housing 114 may cause mechanical strain on the molded insert 108 and lead to a malfunction unless supported. To provide support, one or more bushings 132, such as steel bushings, shown in FIG.

6, may be inserted to contact the base plate 104 at the mounting holes 122. The bushings may be present at the time of molding or inserted after molding. Alternately, the bushings 132 may be a part of, or mounted to, the base plate 102. When the bushing is inserted post-molding, a mold feature (not shown) approximately equal to the outer diameter of the bushing 132 may be incorporated in the mold to both create the hole for the bushing 132 and to hold the base plate 104 in position during the molding process. The inside diameter of the bushings 132 may be equal to the diameter of the mounting hole 122.

Mounting holes 124 can be used for attaching an external wiring connector 134. The mounting holes 124 may use molded-in or pressed-in fasteners, such as nuts 142 or threaded inserts (not depicted). Alternately, the external wiring connector 134 can be mounted with screws that extend through the mounting holes 124 and attach to the stator end of the motor, as is known in the art. In another embodiment, a jam nut on the outside of the base plate 104 can secure the external wiring connector 134. The threads coupling the jam nut may be formed in the molded insert 108 or in the base plate 104. When the connector 134 is mounted from the inside of the end bell 102, the threads for the jam nut may be on the external wiring connector 134 itself.

Figure 5A:
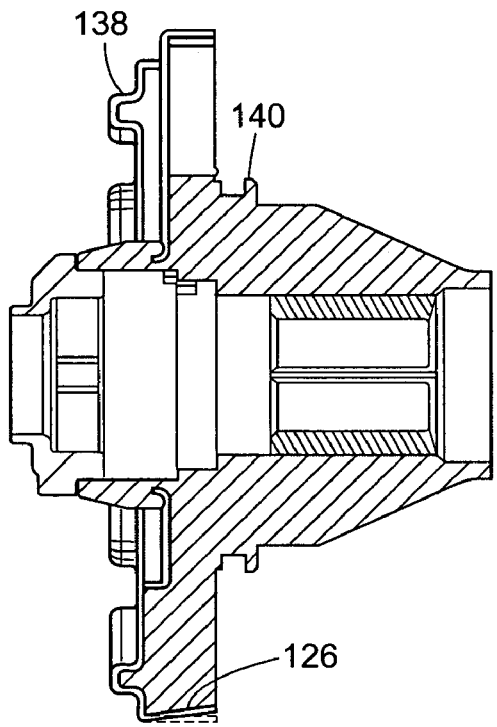
FIG. 5A–5C shows several methods for securing the molded insert to the base plate of FIG. 1.
Figure 5B:
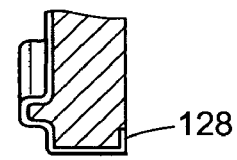
Figure 5C:
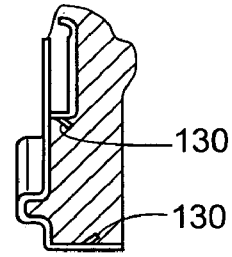
Figure 6:
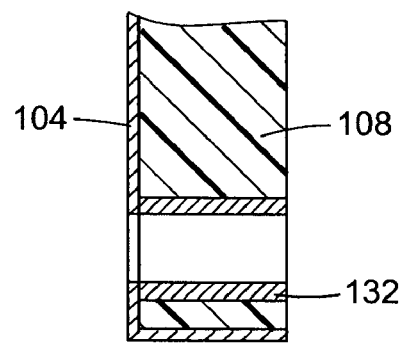
FIG. 6 shows the mounting hole detail for the insert molded end bell of FIG. 1.

Referring to FIGS. 5A–C, when forming the end bell 102 it may be desired to secure the molded insert to the base plate 104. Ultimately, when finally assembled, the force applied by the mounting screws 116 between the base plate 104 and the housing 114 will provide the retaining force for the assembly. However, before final assembly, securing the molded insert 108 to the base plate 104 may be accomplished in several ways. One method is to deform the rim 106 of the base plate 104 prior to filling the molding apparatus (not shown) with the molding compound. FIG. 5A shows how the rim 106 may be plastically deformed toward the centerline of the base plate 104. When the molding compound is injected, the inwardly bent rim 126 will retain the molded insert 108 and any other parts captured by the molded insert.

FIG. 5B shows another mechanism for retaining the molded insert 108. The rim 106 is bent parallel to a plane formed by the base plate 104 toward its centerline to form a cup-shape 128. The molded insert 108 is retained by the cup-shaped portion 128 of the rim 106.

FIG. 5C shows another embodiment wherein burrs 130 are intentionally formed on the rim 106 or other surface of the base plate 104 in contact with the molded insert 108. Similar to the other embodiments, the burrs 130 serve as retention points for securing the base plate 104 to the molded insert 108, for example, until final assembly or during servicing.

After the base plate 104 is prepared, for example, in one of the manners above, the bearing 110 and the base plate 104 are arranged in a conventional and well known molding apparatus (not shown). As discussed above, features of the mold may be used to hold and align the base plate 104 in the molding apparatus. The mold is then filled with a molding compound to connectively couple the bearing 110 to the base plate 104 while forming the end bell 102.

Figure 8:
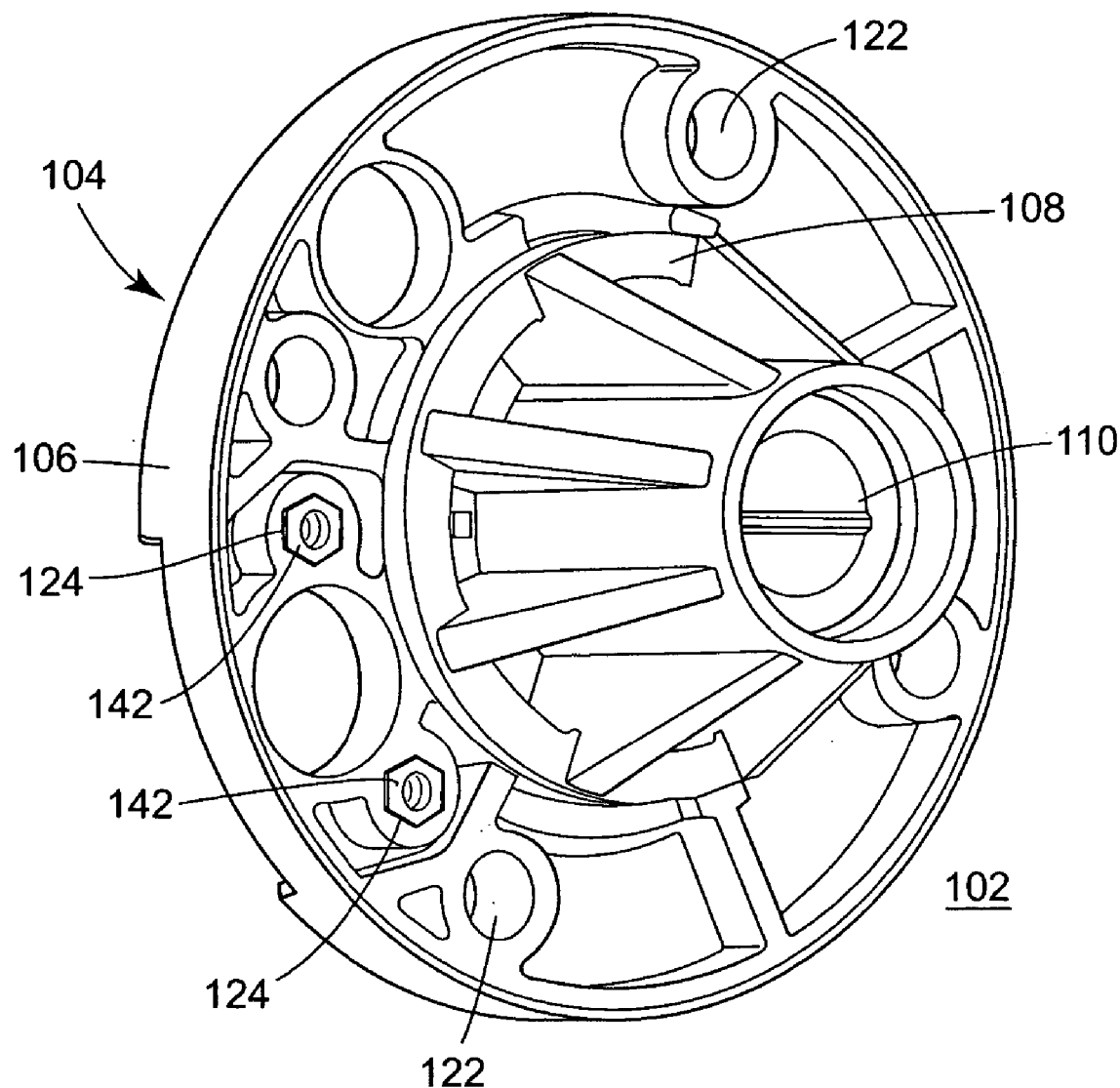
FIG. 8 is a perspective view of the bottom of the end bell of FIG. 1 showing an alternate method of fastening for the wiring connector.

Finally, the bushings 132 and/or fasteners, such as nuts 142 or threaded inserts may be disposed in holes provided, such as holes 122 and 124 respectively. FIG. 8 shows a hex nut 142 disposed in hexagonal-shaped holes 124 for securing the external wiring connector 134. The hex nut 142 can be pressed into the hole 124 or molded in the molded insert 108. The hex nuts 142 may provide a more cost effective alternative to other threaded inserts.

Figure 7:
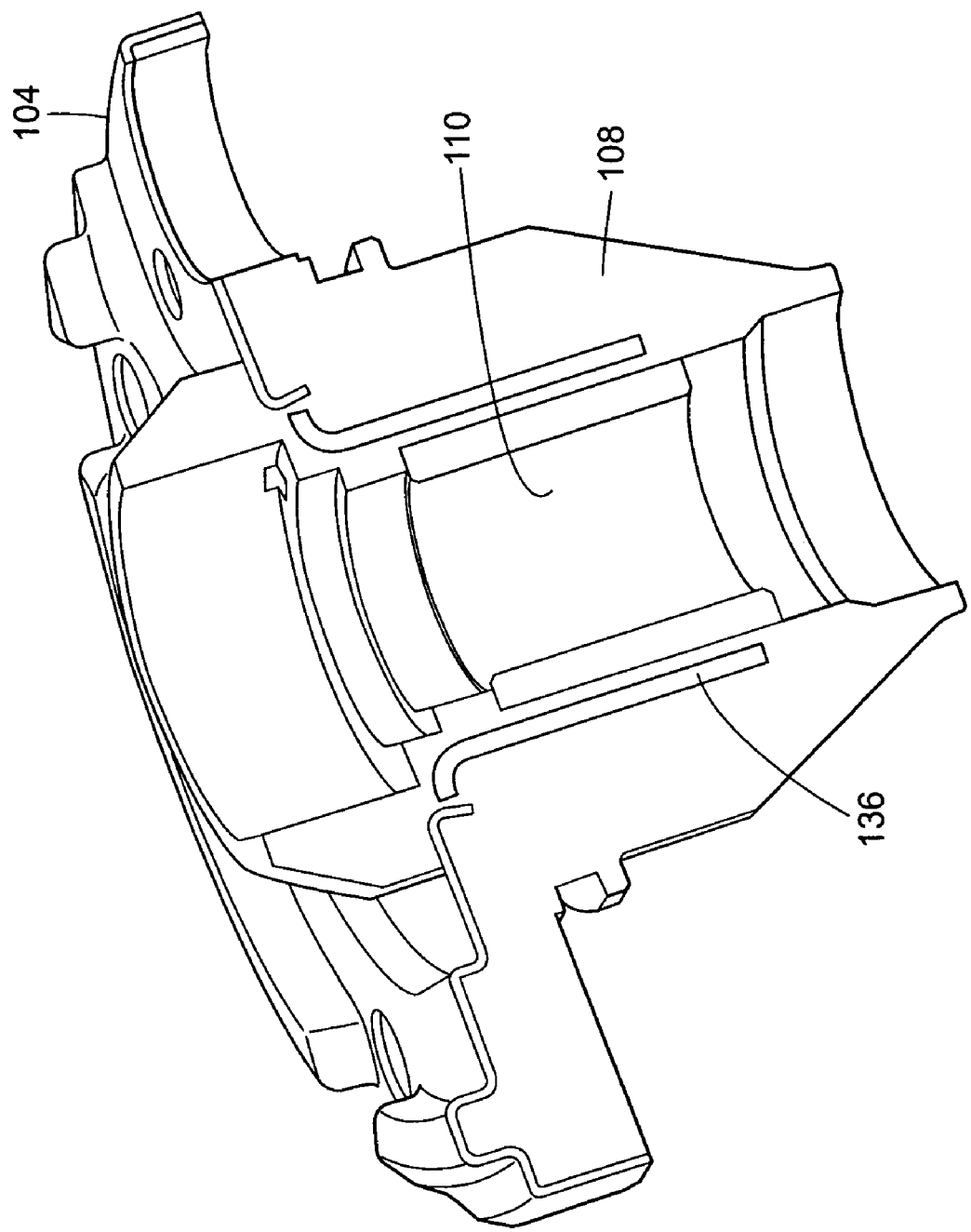
FIG. 7 is a sectional view of the insert molded end bell of FIG. 1 showing a tubular steel support molded therein.

Referring to FIG. 7, a steel insert 136, in one embodiment having a flared-shape, can be disposed circumferentially within the molded insert 108 for additional support, particularly to reduce deflections in the end bell 102 when used in large motors 100. The steel insert 136 preferably has perforations (not shown) for molding compound flow in the manufacturing process and support in operation. The optimum number and placement of perforations is application specific and determined by the composition of the molded insert 108, mold temperature and pressure. The thickness of the steel insert 136 may vary by application. The steel insert 136 may be formed as part of the base plate 104, may be welded to the base plate 104 or may be disposed proximately to the base plate 104. A conventional check valve (not depicted) for releasing moisture from the motor 100 may be incorporated into the base plate 104 or molded insert 108.

While the base plate 104 may be a metal stamping, it may be cast, for example of aluminum or made using a powdered metal process. The bearing 110 may be a known hydrodynamic bearing, that is, when spinning, the shaft 112 is supported by a hydraulic layer and is ideally not in contact with the bearing 110. The bearing 110 may be polyphenlyene sulfide (PPS), brass or other suitable material. The molded insert 108 may be any suitable moldable plastic, such as Rynite 545™ (a trademark of DuPont), a thermoplastic polyester resin, specifically, a glass-reinforced polyethylene terephthalate (PET).

In one embodiment, the entire molded insert 108 can be formed from polyphenlyene sulfide, or other suitable bearing material, eliminating the need for a separate bearing. In that case, a mold component (not shown), with suitable draft for removal of the molded insert, can be used to rough form the bearing inner diameter during the molding operation. As above when using a separate bearing, the final inner diameter of the shaft opening is machined to its final diameter in relationship to one or more features of the base plate 104. By doing so, the shaft opening is both given a final diameter suitable for the corresponding shaft and aligned for accepting the motor shaft 112.

In another embodiment, the molded insert 108 can have a shaft hole formed or bored and a conventional bearing 110 press-fit into the molded insert 108 of the end bell 102. The process for press-fit insertion of a bearing is known.

In yet another embodiment, the molded insert may incorporate an upthrust bearing (not depicted), known in the art, for accommodating situations when the motor rotor (not depicted) pushes against the end bell 102. The upthrust bearing may incorporate a separate plastic disk, but such a surface may be molded into the molded insert 108 or the bearing 110.

Various embodiments of methods and apparatus for manufacturing and using insert molded end bells have been discussed and described. It is expected that these embodiments or others in accordance with the principles of the present invention will have application to many rotating machinery applications. The disclosure extends to the constituent elements or equipment comprising such systems and specifically the methods employed thereby and therein.

We claim:

1. A submersible motor comprising:
a metal housing; and
an end bell for sealing an open end of the housing, the end bell comprising:
a metal base plate having an external surface and an internal surface, the external surface forming an external surface of the motor;

a plastic insert molded to substantially all of the internal surface of the base plate, wherein a portion of the base plate is retainingly embedded in the insert; and wherein the base plate, the insert and the housing include a plurality of aligned mounting holes, each of the holes for receiving a fastener to engage the housing to maintain the insert in engagement with the housing to secure the insert to the base plate and to secure the end bell to the housing.

2. The end bell of claim 1 further comprising:
a bearing embedded in the plastic insert for accepting a motor shaft.

3. The end bell of claim 1 wherein the plastic insert includes a bore forming a bearing surface for accepting a motor shaft.

4. The end bell of claim 2 wherein the final shaft diameter of the bearing is in a predetermined spatial relationship with at least one of a plurality of features.

5. The end bell of claim 1 further comprising a bushing disposed in the plastic insert at the mounting hole.

6. The end bell of claim 5 wherein the bushing is in direct contact with the metal base plate and the bushing has an inner diameter substantially equal to a diameter of the mounting hole.

7. The end bell of claim 1 wherein the base plate is a stamping.

8. The end bell of claim 1 wherein the base plate is stainless steel.

9. The end bell of claim 1 wherein the base plate is a metal casting.

10. The end bell of claim 1 wherein the base plate further comprises a rim, the base plate defining a plane and the rim substantially normal to the plane.

11. The end bell of claim 10 wherein the rim of the base plate is deformed and the deformation further secures the molded insert to the base plate.

12. The end bell of claim 1 where the molded insert is one of a moldable plastic, a thermoplastic polyester resin, and a glass-reinforced polyethylene terephthalate (PET).

13. A motor constructed for use in a submersible application comprising:
a metal housing having an open end;
a motor apparatus disposed in the housing, the motor apparatus comprising a rotor, windings and a shaft; and
an end bell for sealingly closing the open end, the end bell comprising:
a metal base plate having an external surface and an internal surface, the external surface forming an exterior surface of the motor;
a bearing for accepting the shaft;
a plastic insert molded to the bearing and to substantially all of the internal surface of the base plate, wherein a portion of the base plate is retainingly embedded in the insert; and
wherein the base plate, the insert and the housing include a plurality of aligned mounting holes, each of the holes for receiving a fastener to engage the housing maintain the insert in engagement with the housing to secure the insert to the base plate and to secure the end bell to the housing.

14. The motor of claim 13 wherein the base plate comprises one of a rim and a mounting hole, and the bearing has a final inner diameter in a predetermined spatial relationship to one of the rim and the mounting hole.

15. The motor of claim 13 wherein the rim has a cup shape for engaging the molded insert.

16. The motor of claim 13 wherein the rim has a burr disposed the inner surface for engaging the molded insert.

* * * * *